INVENTOR.
Richard H. Donlon
BY
Paul Fitzpatrick
ATTORNEY

United States Patent Office 3,130,740
Patented Apr. 28, 1964

3,130,740
RAMJET FUEL CONTROL
Richard H. Donlon, Santa Barbara, Calif., assignor to General Motors Corporation, Detroit, Mich., a corporation of Delaware
Filed Sept. 19, 1961, Ser. No. 139,208
1 Claim. (Cl. 137—84)

My invention relates to fuel controls for combustion engines, and particularly to an improved fuel control for ramjet engines.

The purpose of my fuel control is to meter fuel to an engine of the ramjet type so as to obtain efficient combustion with proper proportioning of fuel and air within the engine and to limit fuel-air ratio as a function of air speed to prevent excessive speed.

The objectives of the invention are attained with a particularly simple and trouble-free control readily adjustable to variations in desired operating conditions of the engine.

The nature of the invention and its advantages will be apparent to those skilled in the art from the succeeding detailed description of the invention.

Figure 1:
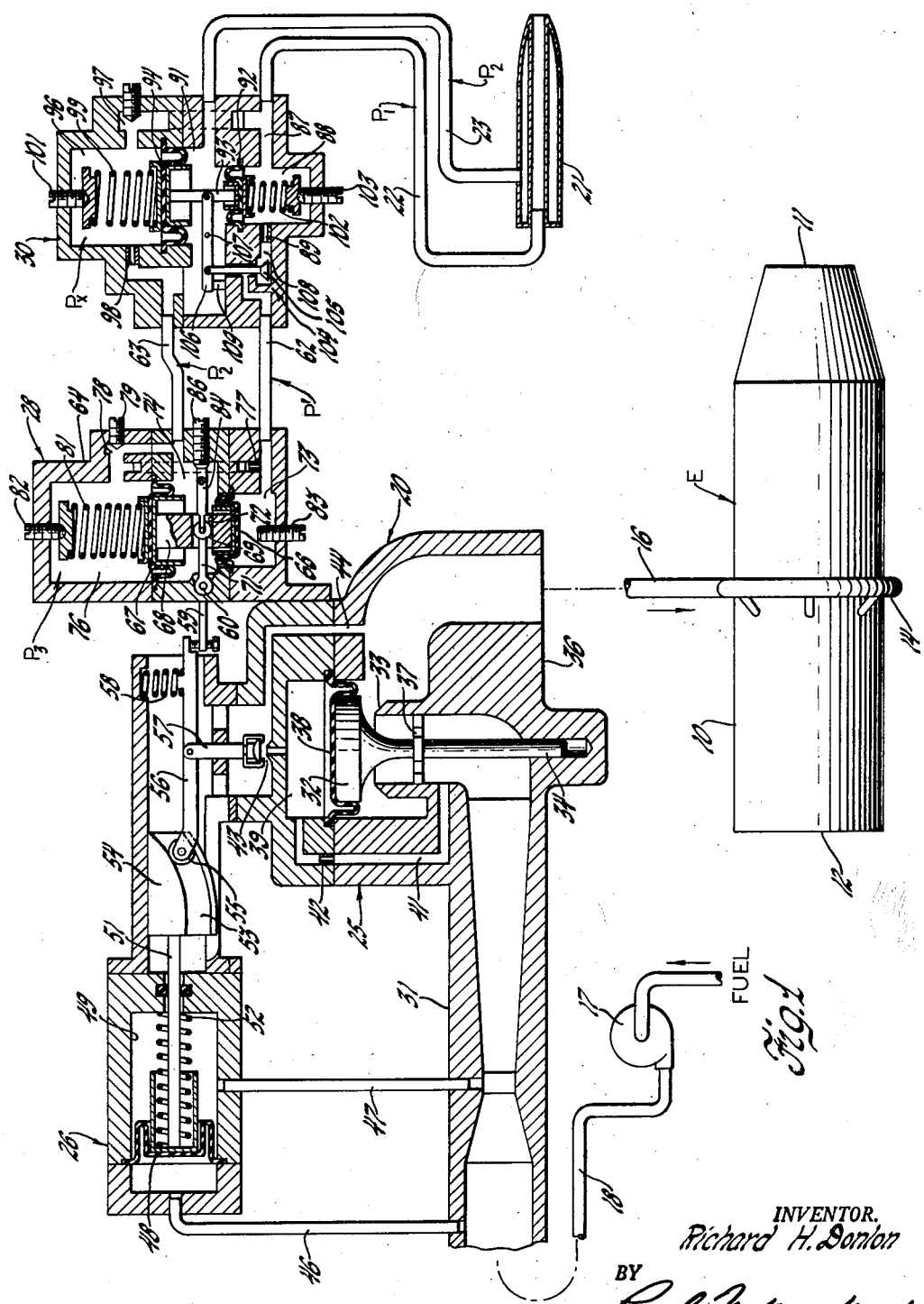
FIGURE 1 is a schematic drawing of a ramjet engine fuel control system embodying the invention.

Referring to FIG. 1, the ramjet engine E, illustrated conventionally, comprises a duct 10 having an air inlet 11 and an exhaust nozzle 12. The combustion space within the duct is supplied with fuel from a suitable fuel manifold 14 supplied through a fuel line 16. Fuel from any suitable source is delivered by any suitable pump 17 through a pump discharge line 18, the fuel controls 20, and line 16 to the engine. The fuel is controlled in response to ambient static and ram pressures sensed by a Pitot-static probe 21 from which ram or total pressure $P_1$ is transmitted to the control 20 through a line 22. Static ambient pressure $P_2$ is transmitted from the head 21 to the control 20 through line 23.

The fuel control 20 involves four major elements; a throttling valve 25 which directly controls the flow to the engine, a fuel metering throttling valve control 26 a differential pressure sensor 28, and a Mach number controller or limiter 30. The pump discharge line 18 is connected to the throttling valve 25 through a venturi 31. The throttling valve comprises a poppet 32 which cooperates with an annular lip 33. The poppet includes a stem 34 suitably guided in the body or case 36 of the control. The end of the valve stem is received in a socket, and a fluted flange 37 on the stem is guided in the inlet conduit to valve 25. The servomechanism which operates the throttling valve comprises a diaphragm 38 defining one end of a chamber 39. Fuel is taken from line 18 ahead of the throttling valve 25, through a passage 41 having a restriction 42, into the chamber 39. Chamber 39 exhausts into the line 16 downstream of the throttling valve 25 through a half-ball servo valve 43 and a passage 44. This is a known type of servo. If the half-ball valve 43 is closed, pressure upstream of valve 25 will fill chamber 39 and close the valve 25 completely. By bleeding the chamber 39 through valve 43, valve 25 may be allowed to open to any desired extent. The servo fuel which has been metered is consumed with the rest of the fuel. It need not be returned to the pump and is not wasted.

The half-ball valve 43 is controlled by means responsive to flow through venturi 31, which is the total engine fuel flow, and to the differential pressure sensor 28. Considering first the fuel flow responsive means, the inlet and throat of venturi 31 are connected through passages 46 and 47, respectively, to opposite sides of a diaphragm 48 within a chamber 49. The diaphragm 48 is coupled to a stem 51 biased by a compression spring 52. The pressure differential across the diaphragm 48 is proportional to the square of fuel flow. The force of the spring 52 is proportional to the displacement of the diaphragm. Thus, the displacement of the diaphragm and therefore of stem 51 will be proportional to the square of fuel flow. Stem 51 moves a cam 54 having a slot 53 of square root contour cooperating with a follower 55 on one end of a floating link 56. The central point of link 56 is pivoted on a reciprocably guided member 57 on which is mounted the movable member of the servo valve 43. The other end of link 56 is biased downwardly by a light compression spring 58 and upwardly by a lever 59 rotated about its fulcrum 60 by the differential pressure sensor 28.

Since cam 54 is a square root cam, the movement of the cam follower 55 is proportional to fuel flow. This provides a feedback of actual fuel flow to the servo-controlled metering valve. The movement of the other end of link 56 by lever 59 provides a fuel control signal which causes the metering valve 25 to open or close to match actual flow, as measured by the venturi meter, with the fuel flow required signal.

The control, as previously mentioned, acts to meter fuel in response to ambient static pressure and ram or total pressure, with an override to reduce fuel to limit aircraft Mach number. The ram and ambient pressures, which may be referred to as the total and static pressures, or as $P_1$ and $P_2$, respectively, are transmitted to the fuel control through the lines 22 and 23 from the Pitot-static probe 21. These lines are coupled through the limiter 30 and lines 62 and 63 to the differential pressure sensor 28. The limiter acts to modify $P_1$ to provide a control pressure $P'$ in line 62; ambient pressure $P_2$ is transmitted unmodified.

For clarity, we may first pass over the operation of limiter 30 and consider the operation of the differential pressure sensor 28 in response to $P'$ and $P_2$. The device 28 comprises a housing portion 64 within which are mounted two coaxial diaphragms 66 and 67 connected by a rigid post 68. A cylindrical follower 69, slidable lengthwise on one arm 71 of lever 59, is disposed in a slot 72 in the post 68. Pressure $P'$ is admitted to a chamber 73 below diaphragm 66, and pressure $P_2$ is admitted to a chamber 74 between the diaphragms. A chamber 76 above diaphragm 67 is connected to the $P'$ line through an orifice 77 and to the $P_2$ line through an orifice 78 which may be adjusted by a threaded needle valve member 79. The pressure in chamber 76, which may be referred to as $P_3$, will take a value intermediate between $P'$ and $P_2$. Post 68 is biased downwardly by compression spring 81, the force of which may be adjusted by an abutment screw 82. The downward movement may be limited by an adjustable stop screw 83.

Without proceeding with a detailed analysis of the differential pressure device 28, it will be apparent that the balance of forces between the diaphragms and the spring 81 will be a function of $P'$ and $P_2$, which will vary the angular position of lever 59 to vary the fuel flow to the engine. The ratio of fuel flow to the position of post 68 may be varied by moving follower 69 along lever arm 71. The follower has a transverse hole within which the arm 71 is slidable. A vertically oscillatable link 84 connected to follower 69 is also coupled to an adjusting screw 86 which acts through link 84 to shift the follower 69.

The limiter 30 is somewhat similar in structure to the sensor 28. A passage 87, a chamber 88, and an orifice 89 connect lines 22 and 62. Lines 23 and 63 are in communication through a chamber 91. Chambers 87 and 91 are separated by a diaphragm 92, which is connected by a rigid post 93 to a diaphragm 94. Diaphragm 94 is biased by the pressure in chamber 91 and that in a third chamber 96, which may be referred to as $P_x$. $P_x$ has a value between $P_1$ and $P_2$, since chamber 96 is supplied from $P_1$ line 22 through an adjustable needle valve orifice 97 and bleeds to $P_2$ through a fixed orifice 98. The diaphragms 92 and 94 are biased downwardly by a compression spring 99 in chamber 96, the setting of which is adjustable by abutment screw 101. This assembly is biased upwardly by compression spring 102 in chamber 88 adjusted by abutment screw 103.

The limiter 30 also includes a normally open valve 104 comprising a movable poppet 105 the stem of which is coupled to a lever 106 fulcrumed at 107 and pivoted to the post 93. Valve 104 is in P' line 108 downstream of orifice 89. When valve 105 is open, P' is lower than $P_1$ as a result of the pressure drop through orifice 89 resulting from the flow through orifices 77 and 78 in the sensor 28. When the Mach number reaches a predetermined limiting value, the diaphragm assembly moves downwardly, moving poppet 105 upward and throttling flow into the P' line, thus reducing the value of pressure P'. The resulting reduced value of P' acts through the sensor to reduce the fuel flow signal and decreases fuel flow to limit aircraft speed to a safe value. Upward movement of post 93 is limited by a suitable stop, such as boss 109 engageable with lever 106.

P' could also be reduced in response to excessive Mach number by a valve opening to bleed air from line 108 rather than throttling it. The result is the same.

*Analysis of Operation*

Figure 3:
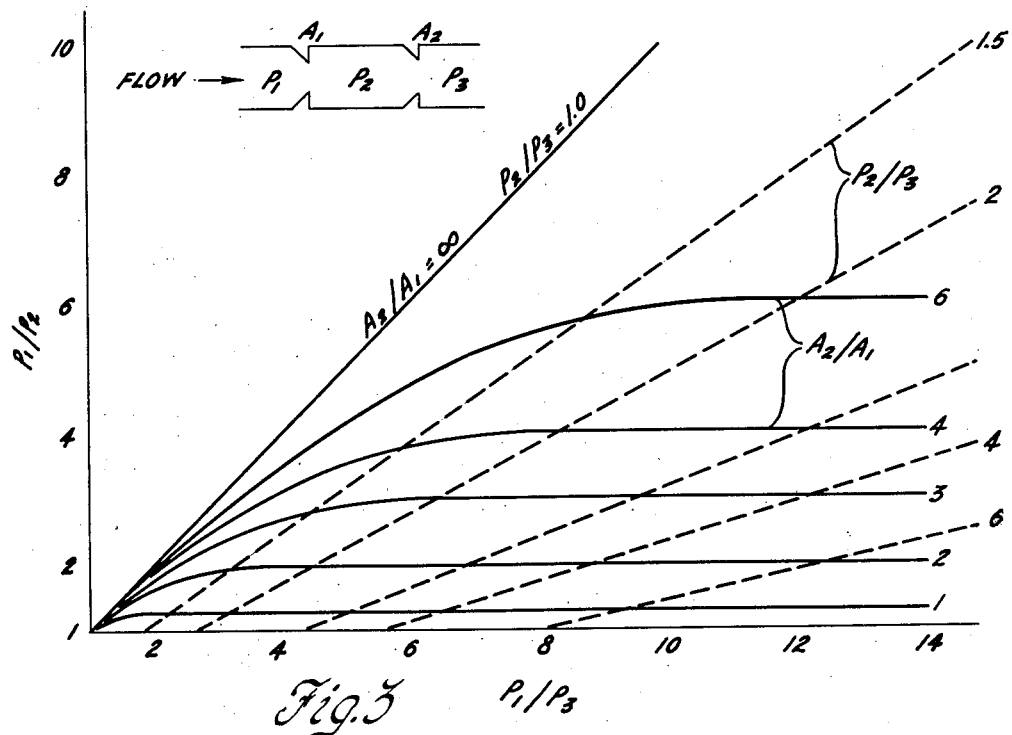
FIGURE 3 is a chart of orifice and pressure ratios.

Having described the structure, it seems best to present a discussion of the principles upon which operation of the control depends. In this connection, FIGURE 3 is a chart illustrating pressure and area relations with respect to flow through orifices in series. The small diagram at the upper left of FIGURE 3 identifies the quantities. The abscissae are $P_1/P_3$, the ordinates are $P_1/P_2$. The solid lines represent the ratio $A_2/A_1$ and the broken lines the ratio $P_2/P_3$.

This chart is developed as follows: It is known that the air flow $W_a$ through an orifice of area $A_1$ with entering pressure $P_1$ and temperature $T_1$ and exit pressure $P_2$ is defined by either of the following equations:

$$W_a = 1.06 A_1 \sqrt{\frac{P_2}{T_1}(P_1-P_2)} \quad (1)$$

$$W_a = 0.53 A_1 P_1 / \sqrt{T_1} \quad (2)$$

The first equation applies where the ratio of $P_1/P_2$ is less than the critical value, which is approximately 2 and will referred to as 2 for simplicity. The second equation applies when the pressure ratio is greater than the critical value of 2. The same equations with the obvious changes in subscripts define the flow through the orifice $A_2$. It is possible to write these equations in terms of a common parameter, $$\frac{W_a \sqrt{T_2}}{A_1 P_2}$$

The results may be plotted for each equation and then cross-plotted to give the result in FIGURE 3, where the coordinates are $P_1/P_2$ and $P_1/P_3$ with lines of constant $P_2/P_3$ and $A_2/A_1$. From FIGURE 3 it will be seen that for any line of $A_2/A_1$, $P_1/P_2$ is constant over the linear portion of the line, which is approximately the portion of the line where $A_2/A_1$ is less than one-half $P_1/P_3$. Expressed differently, $P_2$ is a fixed portion of $P_1$ where $A_1/A_2$ is constant and $P_1/P_3$ is greater than the minimum value necessary for linearity. This relation is used in the Mach number limiter.

Figure 2:
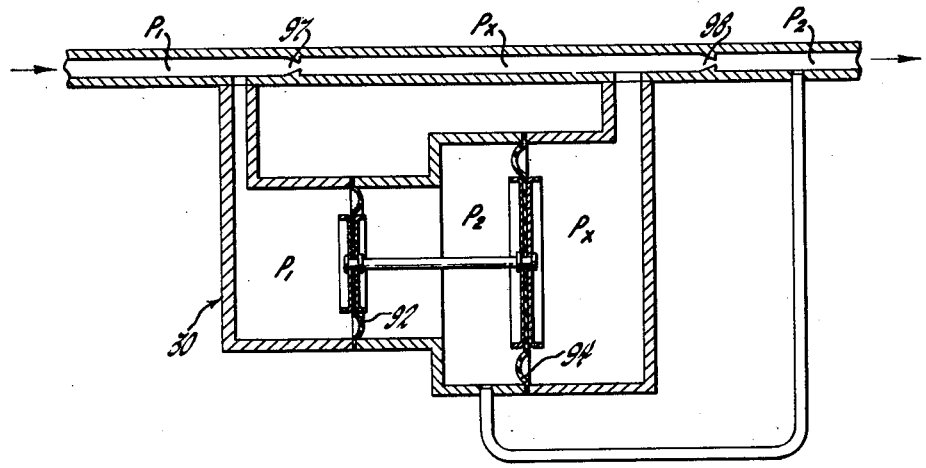
FIGURE 2 is a simplified diagram of a Mach number limiter.

Referring to FIGURE 2, this may represent schematically a control device such as 28 or 30. The identification of the orifices, diaphragms, and pressures in FIGURE 2 and in the succeeding discussion conform to those of the Mach number limiter 30 in FIGURE 1. The orifice areas are $A_{97}$ and $A_{98}$. The diaphragm areas are $A_{92}$ and $A_{94}$. The spring is not illustrated in this schematic because the spring will not be considered at the present. Summing the forces acting on the diaphragms:

$$(P_1-P_2)A_{92} + (P_2-P_x)A_{94} = 0 \quad (3)$$

Assume, for example, $A_{98}/A_{97}=1.0$. For $P_1/P_2$ greater than 2, it appears from the chart, FIGURE 3, that $P_1/P_x=\text{constant}=1.25$. Thus, $P_x=CP_1$ where C is a constant determined by $A_{98}/A_{97}$. This constant is varied by adjusting $A_{97}$ to select the desired Mach number.

We may eliminate $P_x$ by substitution and arrive at the following:

$$\frac{P_1}{P_2} + \frac{A_{94}/A_{92}-1}{1-CA_{94}/A_{92}} = 0 \quad (4)$$

$P_1/P_2$, which we may represent by R, is determined by Mach number (Mn).

$$P_1/P_2 = f(Mn) = R \quad (5)$$

Also, let B represent $A_{94}/A_{92}$
Substituting, $$R + \frac{B-1}{1-CB} = 0 \quad (6)$$

Solving for B, $$B = \frac{R-1}{RC-1} \quad (7)$$

This enables the diaphragm area ratio to be determined for a selected Mn and orifice area ratio. For any given value of Mach number, R is known, and suitable values of diaphragm areas may easily be selected leaving the adjustable orifice 97 to make final adjustment of the Mach number control point.

For Mach numbers above or below the value to which the control is set, the system will be unbalanced. For Mach numbers less than the design Mach number, the resultant force on the diaphragms acts to the right, as shown in FIGURE 2, or upward, as illustrated in FIGURE 1. If the Mach number is above the design point, the diaphragms tend to move in the opposite direction.

The unbalanced force can be converted into a displacement by inserting a spring such as spring 99 in FIGURE 1. In this case, the displacement of the diaphragms is a linear function of the unbalanced force. For Mach number below the design point no output from the Mach number limiter is desired or, in other words, P' should remain equal to $P_1$. The stop 109 prevents movement of the diaphragm during this regime. However, if the Mach number is greater than the design value, the diaphragms act against the spring and progressively close valve 105 to diminish P' relative to $P_1$. This decreases fuel and thereby reduces speed.

It may be shown if the spring constant and preload are inserted into the force Equation 3, that the displacement of the valve is a function of $P_2$ as well as $P_1/P_2$. Thus, $$(P_1-P_2)A_{92} + (P_2-P_x)A_{94} - (Kx+F_0) = 0 \quad (8)$$

where K is spring constant, x is displacement, and $F_0$ is preload. From this, $$x = \frac{(P_1-P_2)A_{92} + (P_2-P_x)A_{94} - F_0}{K} \quad (9)$$

$$x = \frac{P_2}{K}\left[\frac{P_1}{P_2}(A_{92}-CA_{94}) + (A_{94}-A_{92}) - \frac{F_0}{P_2}\right] \quad (10)$$

This device, therefore, is not a pressure ratio sensor, but a pressure ratio limiter which produces no output until the selected pressure ratio is exceeded, the magnitude of the output being dependent on $P_2$. However, for ground-based engines, $P_2$ is relatively constant and this device might be used as a low-cost pressure ratio sensor for application in conjunction with a metering valve or pressure regulator as an acceleration scheduling mechanism for gas turbines. Pressure ratio is usually an excellent parameter for gas turbine acceleration scheduling since it is a true air mass flow parameter and requires no ambient temperature compensation; however, it is generally complex and expensive to mechanize. This device is simple and might be used in such an application if sufficient pressure ratio is avalable and if the nonlinearities for $P_1/P_2$ less than 2.0 can be tolerated.

The similarity of structure of the differential pressure sensor 28 to the Mach number limiter 30 will be apparent. It operates on the same principles, and to repeat the detailed explanation would be superfluous. The differential pressure sensor operates in accordance with the equation:

$$\text{Fuel flow} = C_A(P_1 - C_B P_2) \tag{11}$$

or $f(W_f) = C_A(P_1 - C_B P_2)$, the function being determined by cam 54. Setting a force equation as before, $$(A_{66} - CA_{67})\left[P' - \frac{(A_{66} - A_{67})}{A_{66} - CA_{67}} P_2\right] - F_0 + K_x = f(W_f) \tag{12}$$

where $C = f(A_{78}/A_{77})$ and K, x, and $F_0$ are as in Equation 8. Since $P' = P_1$ except when the Mach number limiter acts, and letting $A_{66} - CA_{67} = C_A$ and $$\frac{A_{66} - A_{67}}{C_A} = C_B$$

taking the proper datum point, the result is $$f(W_f) = C_A(P_1 - C_B P_2) \tag{13}$$

which gives the desired mode of operation of the ramjet engine. The Mach number override simply reduces $P_1$ to reduce fuel below the normal schedule and prevent overspeed of the aircraft.

The various diaphragms, springs, and orifices are proportional for the service for which the control is intended. Adjustment to vary the schedule to fit the control to a specific engine or for other reasons is possible. Orifice 97 is set to establish a Mach number limit. Screw 79, by varying orifice 78, varies both $C_A$ and $C_B$ of Equation 13 and varies these relatively to one another. The ratio adjustment effected by screw 86 varies $C_A$ additionally and independently of $C_B$.

The advantages of this fuel control or flow metering system will be apparent to those skilled in the art, and have been referred to above.

The detailed description of the preferred embodiment of the invention for explaining the principles thereof is not to be construed as limiting the invention since many changes may be made by exercise of skill in the art within the scope of the invention.

I claim:

A device having an output which is a function of $C_1(P_1 - C_2 P_2)$, where $P_1$ and $P_2$ are total and static ambient air pressures, respectively, $P_1$ being greater than $P_2$, and $C_1$ and $C_2$ are adjustable constants, and having means to attenuate the output when $P_1/P_2$ is greater than a parameter $C_3$ which is a function of $P_2$: comprising, in combination, a first series of two throttling means establishing a first control pressure $P_x$ intermediate $P_1$ and $P_2$ between the throttling means including adjusting means for one of the throttling means for setting the value of $C_3$, first pressure balance means responsive to $P_1$ and $P_x$ operative to establish a second control pressure $P'$ equal to $P_1$ when $P_1/P_2$ is less than $C_3$ and less than $P_1$ when $P_1/P_2$ is greater than $C_3$; second series throttling means, including an adjustable throttle, establishing a third control pressure $P_3$ intermediate $P'$ and $P_2$, and second pressure balance means responsive to $P'$ and $P_3$ and including a resilient bias, the second pressure balance means having an output substantially proportional to $C_1(P_1 - C_2 P_2)$, the second pressure balance means including two unequal movable walls coupled together and means for supplying $P_2$ between the walls, $P'$ to the outer side of the smaller wall, and $P_3$ to the outer side of the larger wall, and an adjustable ratio transmission between the movable walls and the output.

References Cited in the file of this patent

UNITED STATES PATENTS

| | | |
|---|---|---|
| 2,792,685 | Constantino | May 21, 1957 |
| 2,850,871 | Drake | Sept. 9, 1958 |
| 2,861,420 | Lewis | Nov. 25, 1958 |
| 2,934,898 | Graefe | May 3, 1960 |
| 2,961,828 | Wheeler | Nov. 29, 1960 |
| 3,002,348 | Haase | Oct. 3, 1961 |
| 3,021,670 | Boler | Feb. 20, 1962 |
| 3,037,350 | Cowles | June 5, 1962 |
| 3,038,301 | Carlson | June 12, 1962 |